US012671333B2

(12) United States Patent
Montanelli et al.

(10) Patent No.: US 12,671,333 B2
(45) Date of Patent: Jun. 30, 2026

(54) ASYNCHRONOUS STATE MACHINE BASED DRIVER FOR DC/DC REGULATORS

(71) Applicant: Allegro MicroSystems, LLC, Manchester, NH (US)

(72) Inventors: Alessandro Montanelli, Vidigulfo (IT); Alessandro Bacceli, Bemareggio (IT); Marco Cignoli, Pavia (IT)

(73) Assignee: Allegro MicroSystems, LLC, Manchester, NH (US)

( * ) Notice: Subject to any disclaimer, the term of this patent is extended or adjusted under 35 U.S.C. 154(b) by 248 days.

(21) Appl. No.: 18/617,885

(22) Filed: Mar. 27, 2024

(65) Prior Publication Data

US 2025/0309773 A1     Oct. 2, 2025

(51) Int. Cl.
*H02M 3/158*     (2006.01)

(52) U.S. Cl.
CPC .................................... *H02M 3/158* (2013.01)

(58) Field of Classification Search
CPC .................................................... H02M 3/158
See application file for complete search history.

(56) References Cited

U.S. PATENT DOCUMENTS

| | | |
|---|---|---|
| 6,166,527 A | 12/2000 | Dwelley et al. |
| 9,285,812 B2 | 3/2016 | Wibben et al. |
| 9,347,998 B2 | 5/2016 | Szczeszynski et al. |
| 9,425,785 B1 | 8/2016 | Wibben |
| 9,520,871 B2 | 12/2016 | Eagen et al. |
| 9,537,383 B1 | 1/2017 | Wibben |
| 9,621,036 B2 | 4/2017 | Wibben |
| 9,641,070 B2 | 5/2017 | Wibben |
| 9,928,194 B2 | 3/2018 | Ross et al. |
| 10,367,500 B2 | 7/2019 | Wibben |
| 11,711,012 B2 | 7/2023 | Ghorband et al. |
| 2016/0233767 A1 | 8/2016 | Sun et al. |
| 2018/0026640 A1* | 1/2018 | Shankar ............... H03K 19/177 326/44 |
| 2018/0049283 A1 | 2/2018 | Lee |
| 2018/0262107 A1 | 9/2018 | Raval et al. |
| 2020/0295657 A1 | 9/2020 | Weiers |
| 2020/0395851 A1 | 12/2020 | Chao |
| 2023/0128894 A1 | 4/2023 | Suraci et al. |
| 2023/0396165 A1* | 12/2023 | Govindarajulu ...... H02M 3/157 |

OTHER PUBLICATIONS

Analog Devices, "1 A/0.6 a Dc to DC Switching Regulator with Independent Positive and Negative Outputs;" Data Sheet ADP5072, Rev. A; Updated Nov. 30, 2022; 23 Pages.
Analog Devices, "2.2MHz Sync Boost and Step-Down Converters;" Data Sheet MAX20414; Initial Release on Feb. 2017; 12 Pages.
Texas Instruments, "LM5045 Full-Bridge PWM Controller with Integrated MOSFET Drivers;" Data Sheet LM5045; Initial Release Feb. 2011; Revised Jan. 2015; 47 Pages.

(Continued)

*Primary Examiner* — Harry R Behm
(74) *Attorney, Agent, or Firm* — DALY, CROWLEY, MOFFORD & DURKEE, LLP

(57)     ABSTRACT

A device includes a signal generator configured to generate signals to control first and second switches coupled in a first half-bridge DC-DC converter configuration, the first and second switches being configured in a buck mode of operation or in a boost mode of operation.

44 Claims, 11 Drawing Sheets

(56)               References Cited

OTHER PUBLICATIONS

Texas Instruments, "UCCx8C4x BiCMOS Low-Power Current-Mode PWM Controller;" Data Sheet UCC28C43; Initial Release Jul. 2000; Revised Nov. 2022; 55 Pages.
Dumitru et al., "An Asynchronous Digital, Hysteretic Controller for an Automotive Application DC-DC Buck Converter;" Proceedings of 2022 International Semiconductor Conference (CAS); Oct. 12, 2022; 4 Pages.
Fernandez et al., "An Asynchronous Finite-State-Machine-Based Buck-Boost Converter for On-Chip Adaptive Power Supply;" Analog Integrated Circuits and Signal Processing, vol. 74, No. 1; Published Oct. 21, 2012; 12 Pages.
PCT International Search Report and Written Opinion dated Apr. 29, 2025 for International Application No. PCT/US2025/013566; 18 Pages.

* cited by examiner

300

|            | SET | RESET | HI-Z |
|------------|-----|-------|------|
| ff_out_pos | 1   | 0     | 0    |
| ff_out_neg | 0   | 1     | 0    |

500

600

700

500

500

ASYNCHRONOUS STATE MACHINE BASED DRIVER FOR DC/DC REGULATORS

BACKGROUND

DC/DC regulators operate by accepting an input DC voltage that may vary over a given range and output a constant DC voltage to provide a stable and reliable power supply. Fluctuations in power can lead to device malfunction or permanent circuit damage. DC/DC regulators ensure longevity and optimal functioning of many conventional electronic devices.

Conventional DC/DC regulators may operate in buck mode (convert an input DC voltage to a lower DC voltage of the same polarity), boost mode (convert an input DC voltage to a higher DC voltage of the same polarity), or buck-boost mode (convert an input DC voltage to a DC voltage of the same or the opposite polarity).

An example of a conventional DC/DC regulator is the UCC28C43 by Texas Instruments™. The UCC28C43 can be used, as a basis, to build with many different DC/DC regulators, but the UCC28C43 can drive only one external switch in case of buck or boost topologies, thus, the UCC28C43 relies on an external freewheeling diode, thereby permitting only asynchronous topologies.

Another example of a conventional DC/DC regulator is the MAX20414 by Analog Devices™. The MAX20414 contains two distinct monolithic voltage converters (one buck and one boost) which share the same input voltage. Thus, the behavior of the two converters is fixed by design; i.e., the MAX20414 cannot be externally configured.

A further example of a conventional DC/DC regulator is the ADP5072 by Analog Devices™. The ADP5072 incorporates two distinct monolithic converters (one boost and one Inverting) which share the same input voltage. Thus, the behavior of the two converters is fixed by design; i.e., the ADP5072 cannot be externally configured. Also, the two converters are asynchronous such that the ADP5072 relies on external free-wheeling diodes to operate.

Another example of a conventional DC/DC regulator is the LM5045 by Texas Instruments™. The LM5045 controls an entire full-bridge (four external switches) to implement isolated regulators. The LM5045 only permitted behavior is the turning ON of the High-Side on one half-bridge always corresponding to the turning ON of the Low-Side on the other half-bridge. Thus, the LM5045 is hard-wired and is not capable of being configured. Also, the two half-bridges of the LM5045 are connected together with a shared inductor, thereby preventing the two half-bridges of the LM5045 from being used as separate channels.

SUMMARY

According to an aspect of the disclosure, a device includes a signal generator configured to generate signals to control first and second switches coupled in a first half-bridge DC-DC converter configuration, the first and second switches being configured in a buck mode of operation or in a boost mode of operation. In an embodiment, the first and second switches are configured in the buck mode configuration, and the signal generator is configured to generate signals to control third and fourth switches coupled in a second half bridge DC-DC converter configuration, the third and fourth switches being configured in a boost mode of operation. In a further embodiment, the first and second half bridges are coupled by an inductor.

In another embodiment, the first and second switches are configured in the buck configuration, and the signal generator is configured to generate signals to control third and fourth switches coupled in a second half bridge DC-DC converter configuration, the third and fourth switches being configured a buck mode of operation. Additionally, the first and second switches may be configured in the boost configuration, and the signal generator maybe configured to generate signals to control third and fourth switches coupled in a second half bridge DC-DC converter configuration, the third and fourth switches being configured a boost mode of operation.

In an additional embodiment, the signal generator includes an asynchronous state machine. The asynchronous state machine have an asynchronous state machine positive output node and an asynchronous state machine negative output node, and the asynchronous state machine may be configured for a first state, a second state, and a third state; and the asynchronous state machine may be configured to allow only a first transition from the first state to the second state, a second transition from the second state to the first state; a third transition from the second state to the third state, and a fourth transition from the third state to the first state.

Features may include when the asynchronous state machine is in the first state, the asynchronous state machine produces a first value at an asynchronous state machine positive output node and a second value at an asynchronous state machine negative output node, the first value not being equal to the second value; the asynchronous state machine, when the asynchronous state machine is in the second state, produces the second value at the asynchronous state machine positive output node and the first value at the asynchronous state machine negative output node; or the asynchronous state machine, when the asynchronous state machine is in the third state, produces the second value at the asynchronous state machine positive output node and the second value at the asynchronous state machine negative output node.

The asynchronous state machine may have an asynchronous state machine set input node, an asynchronous state machine reset input node, and an asynchronous state machine high impedance input node. The asynchronous state machine may transition to the first state when the asynchronous state machine set input node receives a first value; the asynchronous state machine may transition to the second state when the asynchronous state machine reset input node receives the first value; or the asynchronous state machine may transition to the third state when the asynchronous state machine high impedance input node receives the first value.

The signal generator may include a first multiplexer, operatively connected to the asynchronous state machine, having a first multiplexer output node configured to drive the first switch, and a second multiplexer, operatively connected to the asynchronous state machine, having a second multiplexer output node configured to drive the second switch such that the asynchronous state machine positive output node may be operatively connected to a first multiplexer low input node and a second multiplexer high input node and the asynchronous state machine negative output node may be operatively connected to a first multiplexer high input node and a second multiplexer low input node. The first multiplexer may have a first multiplexer selection input node configured to receive a buck/boost signal and the second multiplexer may have a second multiplexer selection input node configured to receive the buck/boost signal.

Another feature may be the asynchronous state machine toggling between the first state and second state during a continuous conduction mode or the asynchronous state machine transitioning to the third state before returning to the first state during a discontinuous conduction mode. A further feature is that the device may be an integrated circuit package.

Additionally, the signal generator may include a first asynchronous state machine operatively connected to the first switch and the second switch and a second asynchronous state machine operatively connected to the third switch and the fourth switch, wherein the first asynchronous state machine is configured for a first state, a second state, and a third state, and the second asynchronous state machine is configured for a first state, a second state, and a third state.

A further feature is the first asynchronous state machine toggling between the first state and second state during a continuous conduction mode and the second asynchronous state machine toggling between the first state and second state during a continuous conduction mode. The first asynchronous state machine may transition to the third state before returning to the first state during a discontinuous conduction mode, and the second asynchronous state machine may transition to the third state before returning to the first state during a discontinuous conduction mode.

Also described is a method that employs a first signal generator on an integrated circuit package, to generate, at a first time, a first set of buck signals to drive first and second switches coupled in a first half-bridge of a two half-bridge DC-DC converter configuration in a buck mode of operation and employs the first signal generator on the integrated circuit package, to generate, at a second time, a first set of boost signals to drive the first and second switches coupled in the first half-bridge of the two half-bridge DC-DC converter configuration in a boost mode of operation. In an embodiment, The method employs a second signal generator on an integrated circuit package, to generate, at a third time, a second set of buck signals to drive third and fourth switches coupled in a second half-bridge of the two half-bridge DC-DC converter configuration in a buck mode of operation and employs the second signal generator on the integrated circuit package, to generate, at a fourth time, a second set of boost signals to drive the third and fourth switches coupled in the second half-bridge of the two half-bridge DC-DC converter configuration in a boost mode of operation.

A feature of the method is driving the two half-bridge DC-DC converter configuration in a buck-boost mode of operation by employing the first signal generator on an integrated circuit package, to generate, at a fifth time, the first set of buck signals to drive the first and second switches coupled in a first half-bridge of a two half-bridge DC-DC converter configuration and employing the second signal generator on the integrated circuit package, to generate, at the fifth time, the second set of boost signals to drive the third and fourth switches coupled in the second half-bridge of the two half-bridge DC-DC converter configuration; or by employing the first signal generator on an integrated circuit package, to generate, at a sixth time, the first set of boost signals to drive first and second switches coupled in a half-bridge configuration and employing the second signal generator on the integrated circuit package, to generate, at the sixth time, the second set of signals to drive the third and fourth switches coupled in the half-bridge configuration in a buck mode of operation.

As further disclosed, a method (a) employs a first signal generator and a second signal generator to drive a two half-bridge DC-DC converter configuration, during a first time, in a buck mode of operation, by (a1) generating, using a first signal generator on an integrated circuit package, a first set of buck signals to drive first and second switches coupled in a first half-bridge of the two half-bridge DC-DC converter configuration, or (a2) generating, using a second signal generator on the integrated circuit package, a second set of buck signals to drive third and fourth switches coupled in a second half-bridge of the two half-bridge DC-DC converter configuration; (b) employs the first signal generator and the second signal generator to drive the two half-bridge DC-DC converter configuration, during a second time, when in a boost mode of operation, by (b1) generating, using the first signal generator on the integrated circuit package, a first set of boost signals to drive first and second switches coupled in the first half-bridge of the two half-bridge DC-DC converter configuration, or (b2) generating, using the second signal generator on the integrated circuit package, a second set of boost signals to drive third and fourth switches coupled in the second half-bridge of the two half-bridge DC-DC converter configuration; and (c) employs the first signal generator and the second signal generator to drive the two half-bridge DC-DC converter configuration, during a third time, when in a buck-boost mode of operation, by (c1) generating, using the first signal generator on an integrated circuit package, the first set of buck signals to drive first and second switches coupled in the first half-bridge of the two half-bridge DC-DC converter configuration, and (c2) generating, using the second signal generator on the integrated circuit package, the second set of boost signals to drive the second set of signals to drive third and fourth switches coupled in the second half-bridge of the two half-bridge DC-DC converter configuration. In an embodiment, the method may employ the first signal generator and the second signal generator to drive the two half-bridge DC-DC converter configuration, during a fourth time, when in a buck-boost mode of operation, by generating, using the first signal generator on an integrated circuit package, the first set of boost signals to drive first and second switches coupled in the first half-bridge of the two half-bridge DC-DC converter configuration and generating, using the second signal generator on the integrated circuit package, the second set of buck signals to drive the second set of signals to drive third and fourth switches coupled in the second half-bridge of the two half-bridge DC-DC converter configuration.

In another embodiment, the method may (d) employ the first signal generator and the second signal generator to drive the two half-bridge DC-DC converter configuration, during a fourth time, when in a dual buck mode of operation, by (d1) generating, using a first signal generator on an integrated circuit package, a first set of buck signals to drive first and second switches coupled in a first half-bridge of the two half-bridge DC-DC converter configuration, and (d2) generating, using a second signal generator on the integrated circuit package, a second set of buck signals to drive third and fourth switches coupled in a second half-bridge of the two half-bridge DC-DC converter configuration; and (c) employ the first signal generator and the second signal generator to drive the two half-bridge DC-DC converter configuration, during a fourth time, when in a dual boost mode of operation, by (e1) generating, using the first signal generator on the integrated circuit package, a first set of boost signals to drive first and second switches coupled in the first half-bridge of the two half-bridge DC-DC converter configuration, and (e2) generating, using the second signal generator on the integrated circuit package, a second set of boost signals to drive third and fourth switches coupled in the second half-bridge of the two half-bridge DC-DC converter configuration.

BRIEF DESCRIPTION OF THE DRAWINGS

The drawings are only for purposes of illustrating various embodiments and are not to be construed as limiting, wherein.

DETAILED DESCRIPTION OF THE DRAWINGS

Figure 1:
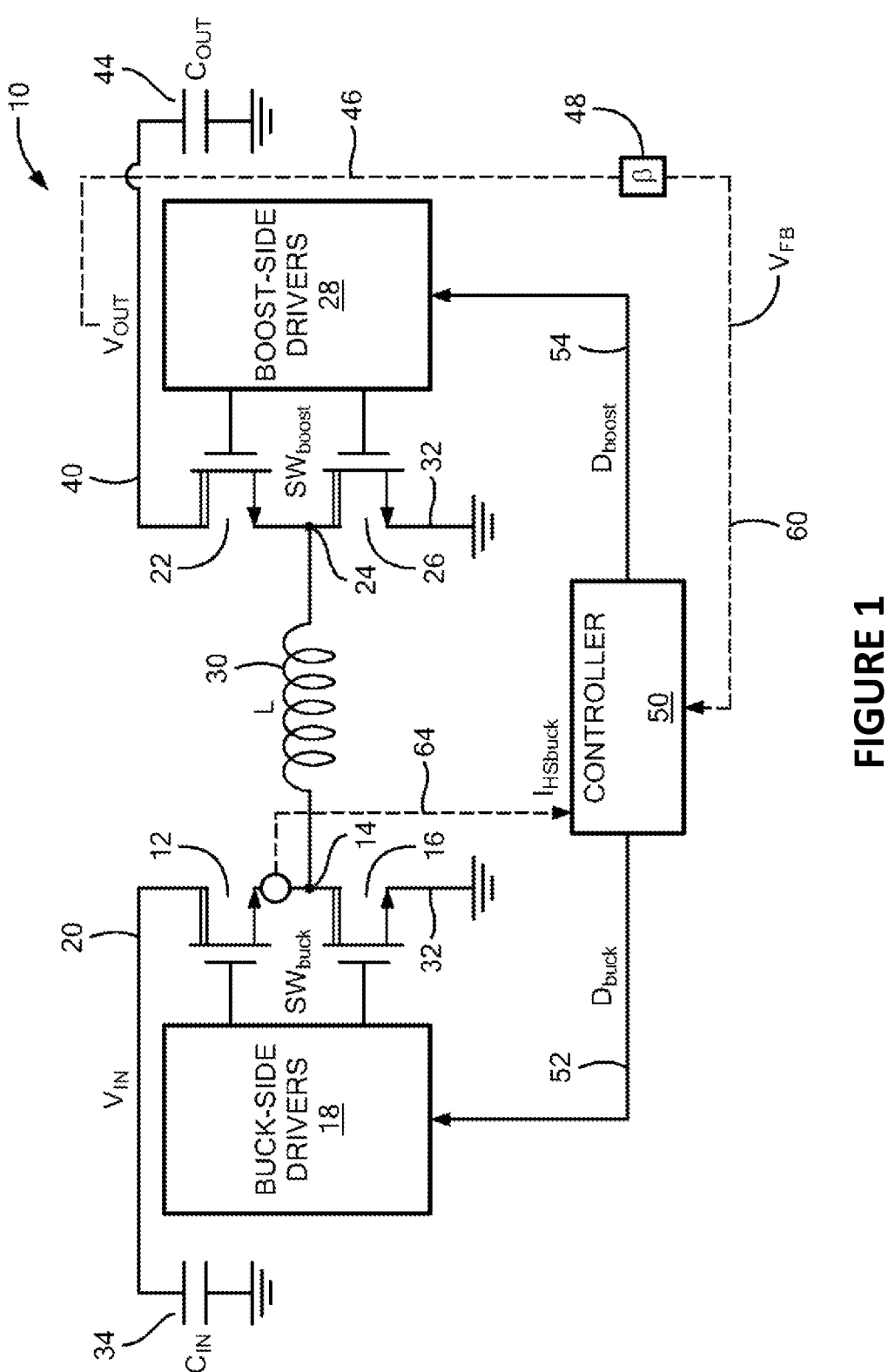
FIG. 1 illustrates a buck-boost converter.

FIG. 1 illustrates a buck-boost converter 10 having a high side buck switch 12 coupled to a low side buck switch 16 at a first switch node $SW_{buck}$ 14 and a high side boost switch 22 coupled to a low side boost switch 26 at a second switch node $SW_{boost}$ 24. The buck-boost converter 10 is configured to have an inductor 30 coupled between the first switch node 14 and the second switch node 24. The buck switches 12, 16 are coupled between an input voltage source $V_{IN}$ 20 and a ground reference potential 32. An input capacitor 34 can be coupled to the input voltage source 20. The boost switches 22, 26 are coupled between the converter output at which a regulated output voltage $V_{OUT}$ 40 is provided and ground 32. An output capacitor 44 can be coupled to the converter output 40.

Controller 50 is configured to generate control signals for both the buck side switches 12, 16 and also for the boost side switches 22, 26. Buck-side drivers 18 are coupled to receive a control signal $D_{buck}$ 52 from controller 50 and to generate control signals for buck switches 12, 16. Similarly, boost-side drivers 28 are coupled to receive a control signal $D_{boost}$ 54 from controller 50 and to generate control signal for boost switches 22, 26.

Controller 50 is coupled to receive a feedback voltage VFB 60 and a current sense signal $I_{HSbuck}$ 64. The current sense signal 64 is indicative of a current $I_L$ through the inductor 30. In this embodiment, the current sense signal 64 is indicative of a current through the high side buck switch 12 when the switch is ON and thus, this sensed inductor current can be represented as $I_{HSbuck}$. However, it will be appreciated by those of ordinary skill in the art that other schemes for sensing the inductor current $I_L$ are possible.

The feedback voltage 60 is based on the converter output voltage 40 and may be level-shifted by an element 48 to a reference voltage level, for example on the order of 1.0V. Various schemes are possible for implementing element 48, such as a resistive partition and, optionally, a feedforward capacitor to introduce a phase boost, for example.

Controller 50 can implement current mode control based on the current sense signal 64 and can include a robust single voltage control loop based on the feedback signal 60.

Figure 2:
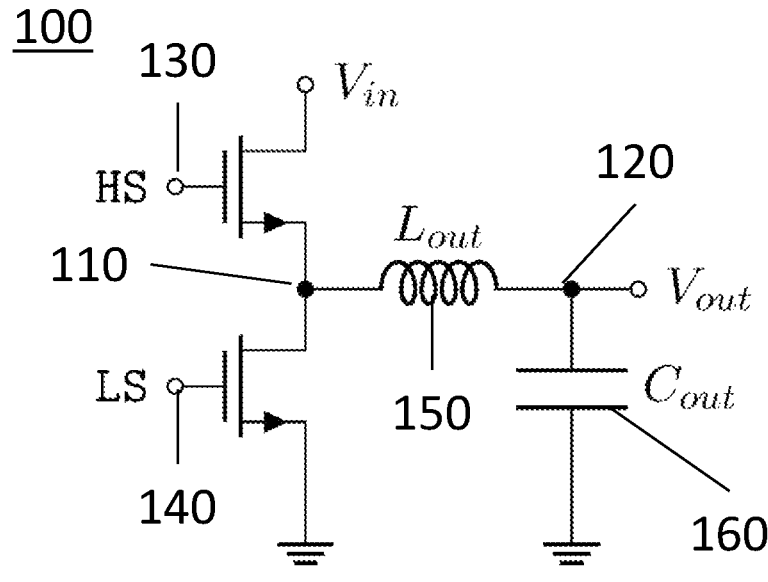
FIG. 2 illustrates a topology of a half-bridge configured for buck mode.

FIG. 2 illustrates a topology of a half-bridge configured for buck mode. As illustrated in FIG. 2, a half-bridge 100 includes a high side switch HS coupled to a low side switch LS at a first node 110. An inductor 150 coupled between the first node 110 and a second node 120. The second node 120 is coupled to a capacitor 160. The high side switch HS and the low side switch LS are coupled between an input voltage source $V_{IN}$ and a ground reference potential. An input capacitor can be coupled to the input voltage source.

The gate of the high side switch HS is coupled to an output node (e.g., 421 of FIG. 6) at high side switch gate input node 130. The gate of the low side switch LS is coupled to an output node (e.g., 431 of FIG. 6) at low side switch gate input node 140.

Figure 3:
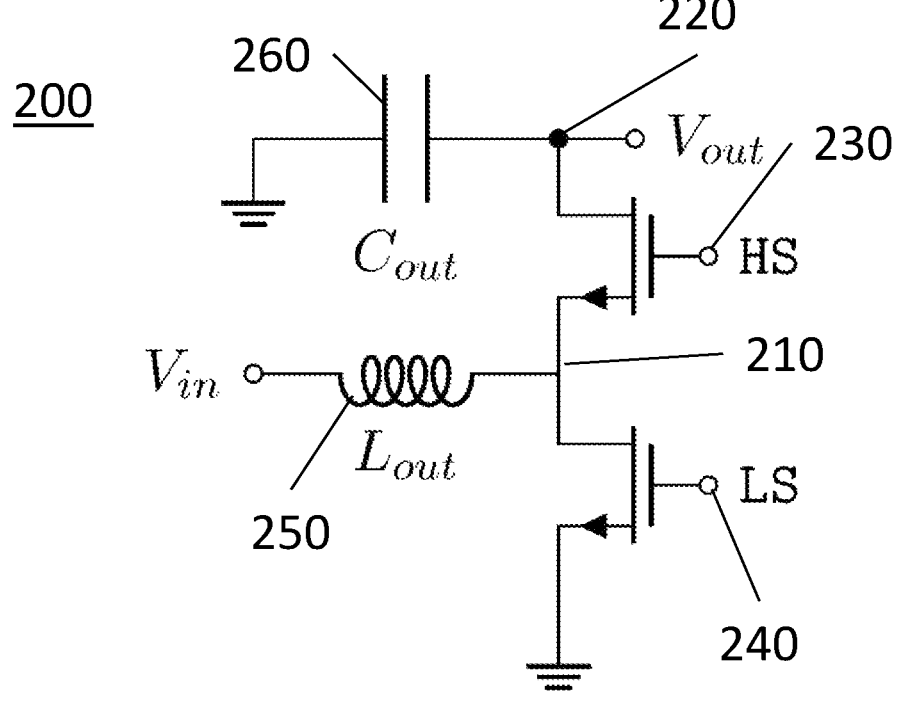
FIG. 3 illustrates a topology of a half-bridge configured for boost mode.

FIG. 3 illustrates a topology of a half-bridge configured for boost mode. As illustrated in FIG. 3, a half-bridge 200 includes a high side switch HS coupled to a low side switch LS at a first node 210. An inductor 250 coupled between the first switch node 210 and an input voltage source $V_{IN}$. A second node 220 can be coupled to a capacitor 260. The high side switch HS and the low side switch LS are coupled between an output voltage source $V_{OUT}$ and a ground reference potential.

Figure 6:
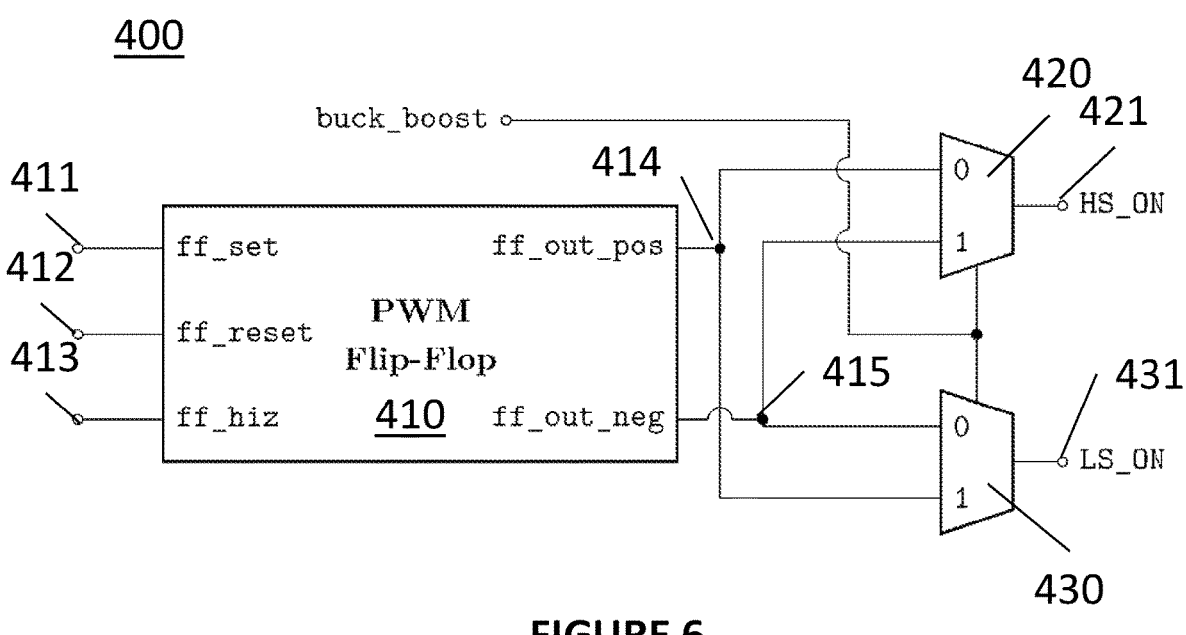
FIG. 6 illustrates a block diagram of pulse-width modulator based signal generator conforming to the state diagram of FIG. 5.

The gate 230 of the high side switch HS is coupled to an output node (e.g., 421 of FIG. 6). The gate 240 of the low side switch LS is coupled to an output node (e.g., 431 of FIG. 6).

Figure 4:
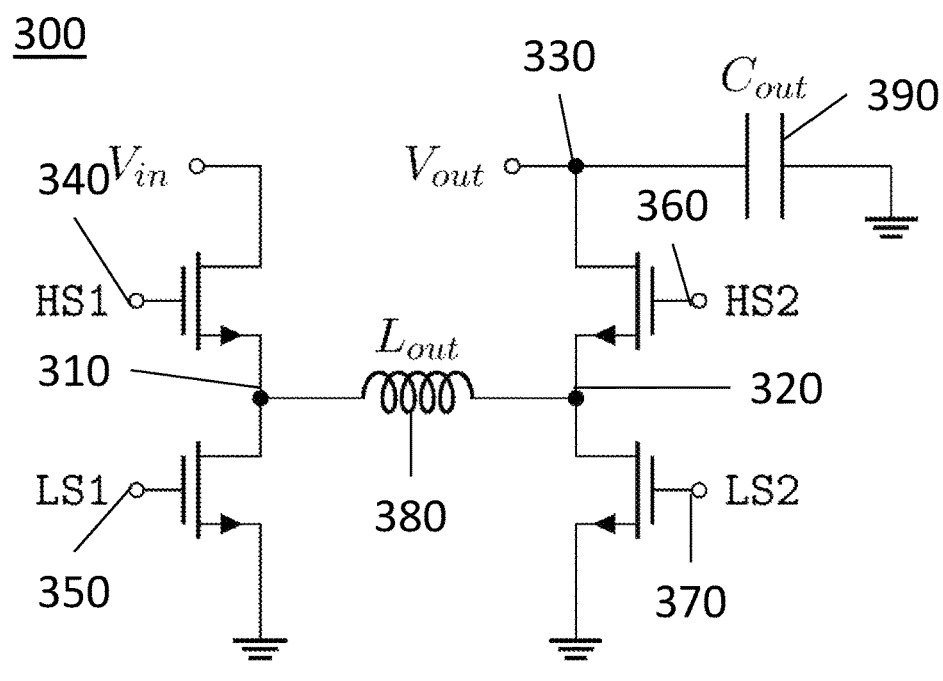
FIG. 4 illustrates a topology of two half-bridges configured for buck-boost mode.

FIG. 4 illustrates a topology of two half-bridges configured for buck-boost mode. As illustrated in FIG. 4, two half-bridges 300 include a high side switch HS1 coupled to a low side switch LS1 at a first node 310 and a high side switch HS2 coupled to a low side switch LS2 at a second node 320. An inductor 380 is coupled between the first node 310 and a second node 320. A third node 330 is coupled to a capacitor 390. The high side switch HS1 and the low side switch LS1 are coupled between an input voltage source $V_{IN}$ and a ground reference potential. An input capacitor can be coupled to the input voltage source.

The gate 340 of the high side switch HS1 is coupled to an output node of a first pulse-width modulator based signal generator (not shown). The gate 350 of the low side switch LS1 is coupled to an output node of the first pulse-width modulator based signal generator.

A third node 330 can be coupled to a capacitor 390. The high side switch HS2 and the low side switch LS2 are coupled between an output voltage source $V_{OUT}$ and a ground reference potential.

The gate 360 of the high side switch HS2 is coupled to an output node of a second pulse-width modulator based signal generator (not shown). The gate 370 of the low side switch LS2 is coupled to an output node of the second pulse-width modulator based signal generator.

Figure 5:
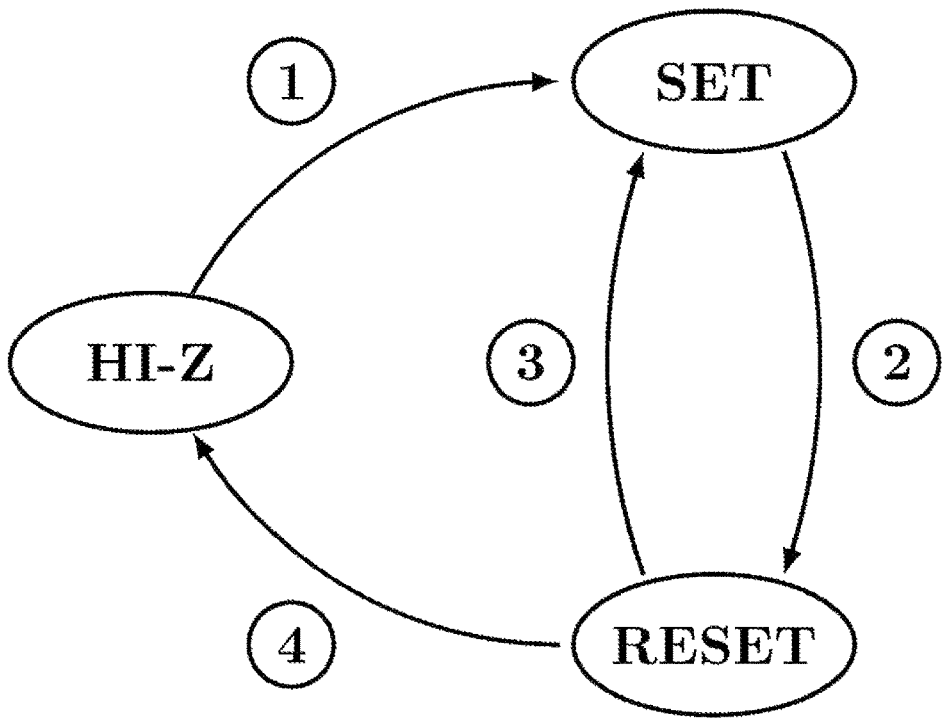
FIG. 5 illustrates a state diagram for a pulse-width modulator used in a DC/DC regulator drive circuit.

FIG. 5 illustrates a state diagram for a pulse-width modulator (asynchronous state machine) used in a DC/DC regulator drive circuit. The SET state represents the turned ON state of one switch of one of the half-bridges. The RESET state represents the turned ON state of the other switch of the half-bridges. The HI-Z (high impedance) state represents the state when both switches are turned off.

In this configuration, the only permitted transitions between these three states are represented by the four arrows in FIG. 5. During Continuous Conduction Mode (CCM), the asynchronous state machine keeps toggling between the SET and RESET states (transitions sequence: 2→3→2→3→ . . . ). During Discontinuous Conduction Mode (DCM), the asynchronous state machine goes also through the HI-Z state for part of the switching period, then the asynchronous state machine wakes up again (transitions sequence: 1→2→4→1→ . . . ).

The configuration of the asynchronous state machine covers all possible use cases for a synchronous DC/DC regulator, while minimizing the number of states and the transitions therebetween.

FIG. 6 illustrates a block diagram of pulse-width modulator based signal generator 400 conforming to the state diagram of FIG. 5. As illustrated in FIG. 6, the pulse-width modulator based signal generator 400 includes an asynchronous state machine (pulse-width modulator flip-flop) 410 having an asynchronous state machine positive output node 414 and an asynchronous state machine negative output node 415.

The pulse-width modulator based signal generator 400 also includes a first multiplexer 420 having a first multiplexer output node 421 configured to drive a first power FET switch (not shown) configured in a half-bridge and a second multiplexer 430 having a second multiplexer output node 431 configured to drive a second switch power FET (not shown) configured in the half-bridge.

The asynchronous state machine 410 has an asynchronous state machine set input node 411, an asynchronous state machine reset input node 412, and an asynchronous state machine high impedance input node 413.

The first multiplexer 420 has a first multiplexer low input node and a first multiplexer high input node, and the second multiplexer 430 has a second multiplexer low input node and a second multiplexer high input node.

The asynchronous state machine positive output node 414 is operatively connected to the first multiplexer 420 low input node and the second multiplexer 430 high input node. The asynchronous state machine negative output node 415 is operatively connected to the first multiplexer 420 high input node and the second multiplexer 430 low input node.

As noted above, the asynchronous state machine 410 is configured for a first state, a second state, and a third state, wherein the configuration only allows a first transition from a first state to a second state, a second transition from the second state to the first state; a third transition from the second state to a third state, and a fourth transition from the third state to the first state.

Figure 7:
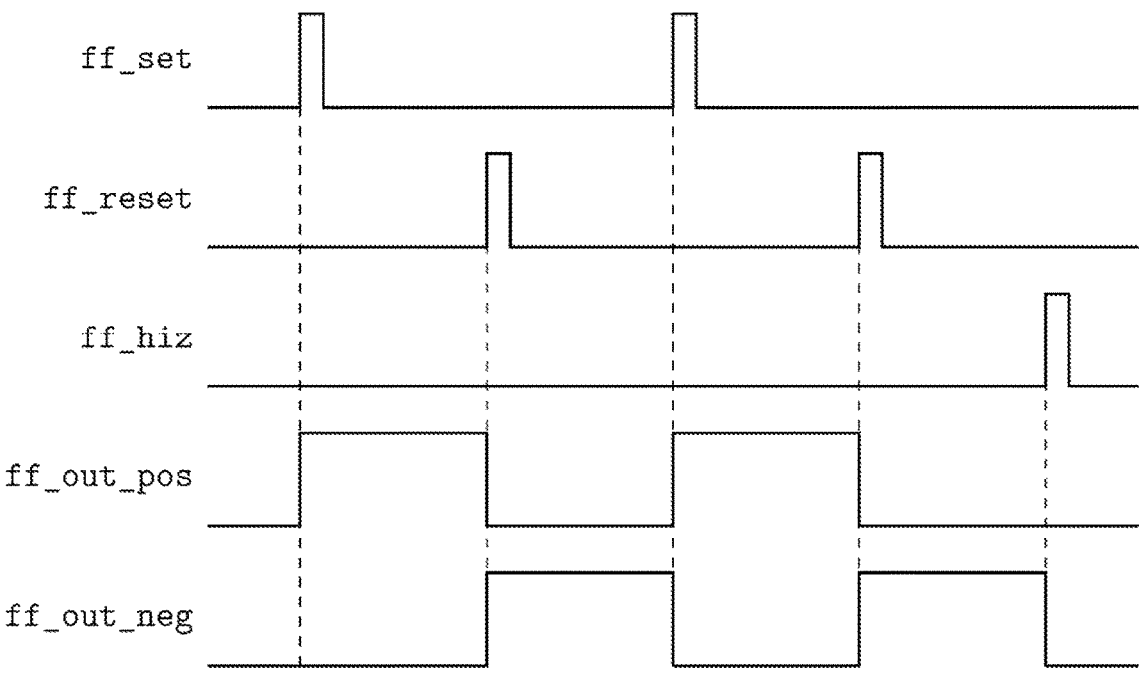
FIG. 7 illustrates waveforms for the pulse-width modulator of FIG. 6.

The asynchronous state machine 410 transitions to the first state when the asynchronous state machine set input node 411 receives a first value, such a high value as illustrated in FIG. 7. The asynchronous state machine 410 transitions to the second state when the asynchronous state machine reset input node 412 receives the first value, such a high value as illustrated in FIG. 7. The asynchronous state machine 410 transitions to the third state when the asynchronous state machine high impedance input node 413 receives the first value, such a high value as illustrated in FIG. 7.

The first multiplexer 420 and the second multiplexer 430 are configured to receive a buck/boost signal to control the selection of the input node to the output node.

The first multiplexer 420 passes a signal on the first multiplexer low input node to the first multiplexer output node 421, when a buck/boost signal indicates a buck mode, to drive a first power FET switch (not shown), and the second multiplexer 430 passes a signal on the second multiplexer low input node to the second multiplexer output node 431, when the buck/boost signal indicates a buck mode, to drive a second power FET switch (not shown).

The first multiplexer 420 passes a signal on the first multiplexer high input node to the first multiplexer output node 421, when the buck/boost signal indicates a boost mode, to drive the first power FET switch (not shown), and the second multiplexer 430 passes a signal on the second multiplexer high input node to the second multiplexer output node 431, when the buck/boost signal indicates a boost mode, to drive the second power FET switch (not shown).

It is noted that adding the two multiplexers at the asynchronous state machine's output pins realizes two objectives during Discontinuous Conduction Mode (DCM), notwithstanding buck or boost mode. More specifically, the entry into the HI-Z state is always done when the inductor current is decreasing from positive values towards zero, and the wake-up from the HI-Z state is always done by turning ON the switch that makes the inductor current increase from zero to positive values.

FIG. 7 illustrates waveforms for the pulse-width modulator of FIG. 6. As illustrated in FIG. 7, when the asynchronous state machine of FIG. 6 receives a high value at the asynchronous state machine set input node (ff_set), the asynchronous state machine is in the first state and produces a first value for ff_out_pos at the asynchronous state machine positive output node and a second value for ff_out_neg at the asynchronous state machine negative output node. In this example the first value is a high value and the second value is a low value.

When the asynchronous state machine of FIG. 6 receives a high value at the asynchronous state machine reset input node (ff_reset), the asynchronous state machine is in the second state and produces a third value for ff_out_pos at the asynchronous state machine positive output node and a fourth value for ff_out_neg at the asynchronous state machine negative output node. In this example the fourth value is a high value and the third value is a low value.

When the asynchronous state machine of FIG. 6 receives a high value at the asynchronous state machine high impedance input node (ff_hiz), the asynchronous state machine is in the third state and produces a fifth value for ff_out_pos at the asynchronous state machine positive output node and a sixth value for ff_out_neg at the asynchronous state machine negative output node. In this example the fifth value is a low value and the sixth value is a low value.

It is noted in the description above, the values can be switched so long as the relative difference between the values remains.

While example embodiments are shown having a flip-flop and multiplexer circuit elements, it is understood that a variety of alternative elements and/or configurations, including hardware and/or software elements and arrangements well known in the art can be used to achieve equivalent functionality without departing from the scope of the invention as claimed.

Figures 8, 9:
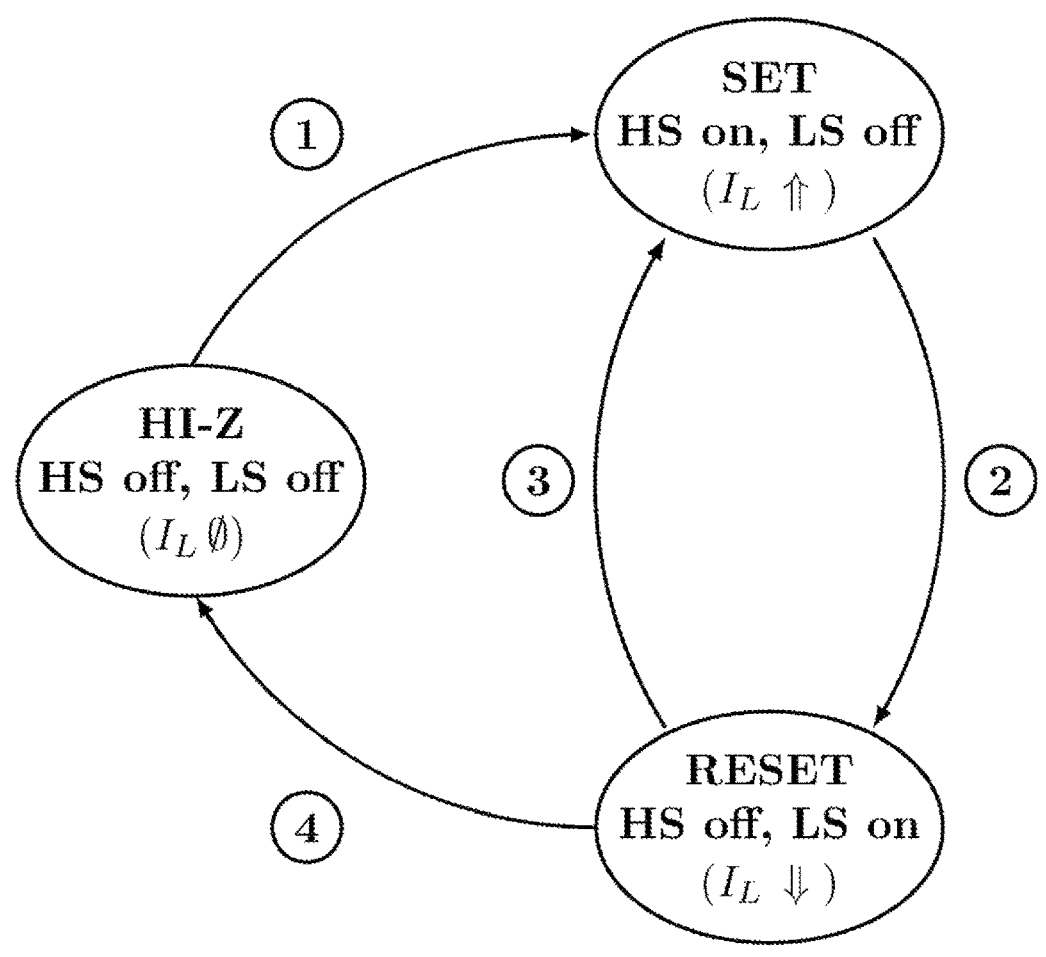
FIG. 8 illustrates a table showing internal state of the pulse-width modulator and corresponding output signals.
FIG. 9 illustrates a state diagram for a pulse-width modulator used in a DC/DC regulator drive circuit in buck mode.

FIG. 8 illustrates a table showing internal state of the pulse-width modulator and corresponding output signals. As illustrated in FIG. 8, when the asynchronous state machine is in a first state (SET), the value for ff_out_pos is a high value, and the value for ff_out_neg is a low value. When the asynchronous state machine is in a second state (RESET), the value for ff_out_pos is a low value, and the value for ff_out_neg is a high value. Lastly, when the asynchronous state machine is in a third state (HI-Z), the value for ff_out_pos is a low value, and the value for ff_out_neg is a low value.

It is noted in the description above, the values can be switched so long as the relative difference between the values remains.

It is further noted that in the above configuration, the beginning of each switching period ($T_{sw}$) is at the turn ON of the HS switch, and the "on-time" ($T_{on}$) is the time interval in which the HS switch is ON. The called "off-time" ($T_{off}$) is the remaining time interval inside the switching cycle ($T_{off}=T_{sw}-T_{on}$).

Additionally, it is noted that adding the two multiplexers at the asynchronous state machine's output pins realizes two objectives during Discontinuous Conduction Mode (DCM), notwithstanding buck or boost mode. More specifically, the entry into the HI-Z state is always done when the inductor current is decreasing from positive values towards zero, and the wake-up from the HI-Z state is always done by turning ON the switch that makes the inductor current increase from zero to positive values.

FIG. 9 illustrates a state diagram for a pulse-width modulator used in a DC/DC regulator drive circuit in buck mode. As illustrated in FIG. 9, the SET state corresponds to HS switch turned ON, LS switch turned OFF, and the inductor current $I_L$ is increasing. The RESET state corresponds to HS switch turned OFF, LS switch turned ON, and the inductor current $I_L$ is decreasing. The HI-Z state corresponds to both HS and LS switches turned OFF, and inductor current $I_L$ is zero.

The transitions between one state and another state are triggered on the following events: 1 and 3 begin of the switching cycle; 2: end of the ON phase; 4: and inductor current has reached zero (DCM operation).

Figure 10:
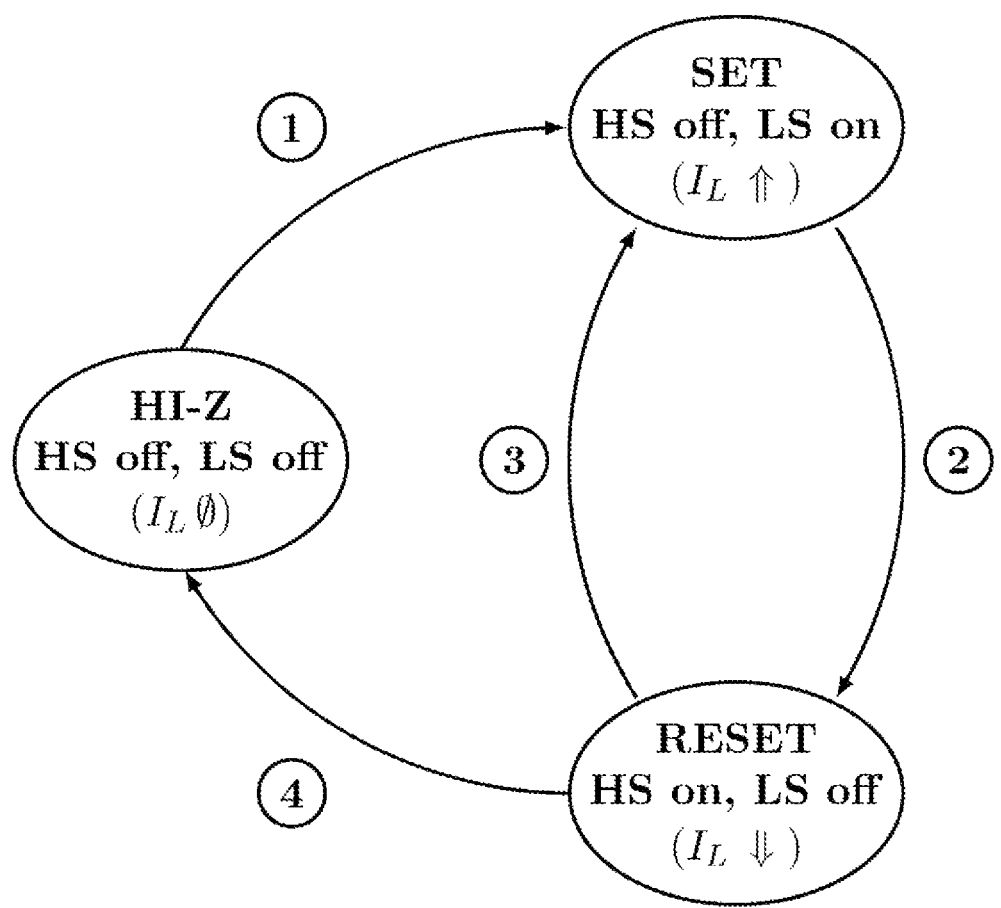
FIG. 10 illustrates a state diagram for a pulse-width modulator used in a DC/DC regulator drive circuit in boost mode.

FIG. 10 illustrates a state diagram for a pulse-width modulator used in a DC/DC regulator drive circuit in boost mode. As illustrated in FIG. 10, the SET state corresponds to HS switch turned OFF, the LS switch turned ON, and the inductor current $I_L$ is increasing. The RESET state corresponds to HS switch turned ON, the LS switch turned OFF, and the inductor current $I_L$ is decreasing. The HI-Z state corresponds to both HS and LS switches turned OFF, and the inductor current $I_L$ is zero.

The transitions between one state and another state are triggered on the following events: 1: before the actual begin of the switching cycle; 2: begin of the switching cycle; 3: end of the ON phase; 4: inductor current has reached zero (DCM operation).

In buck-boost embodiments, one asynchronous state machine controls one half-bridge only; i.e., two twin asynchronous state machines are used for the two different half-bridges. To obtain a shared-inductor buck-boost configuration, one asynchronous state machine is configured to work in buck and the other asynchronous state machine is configured to work in boost.

Figure 11:
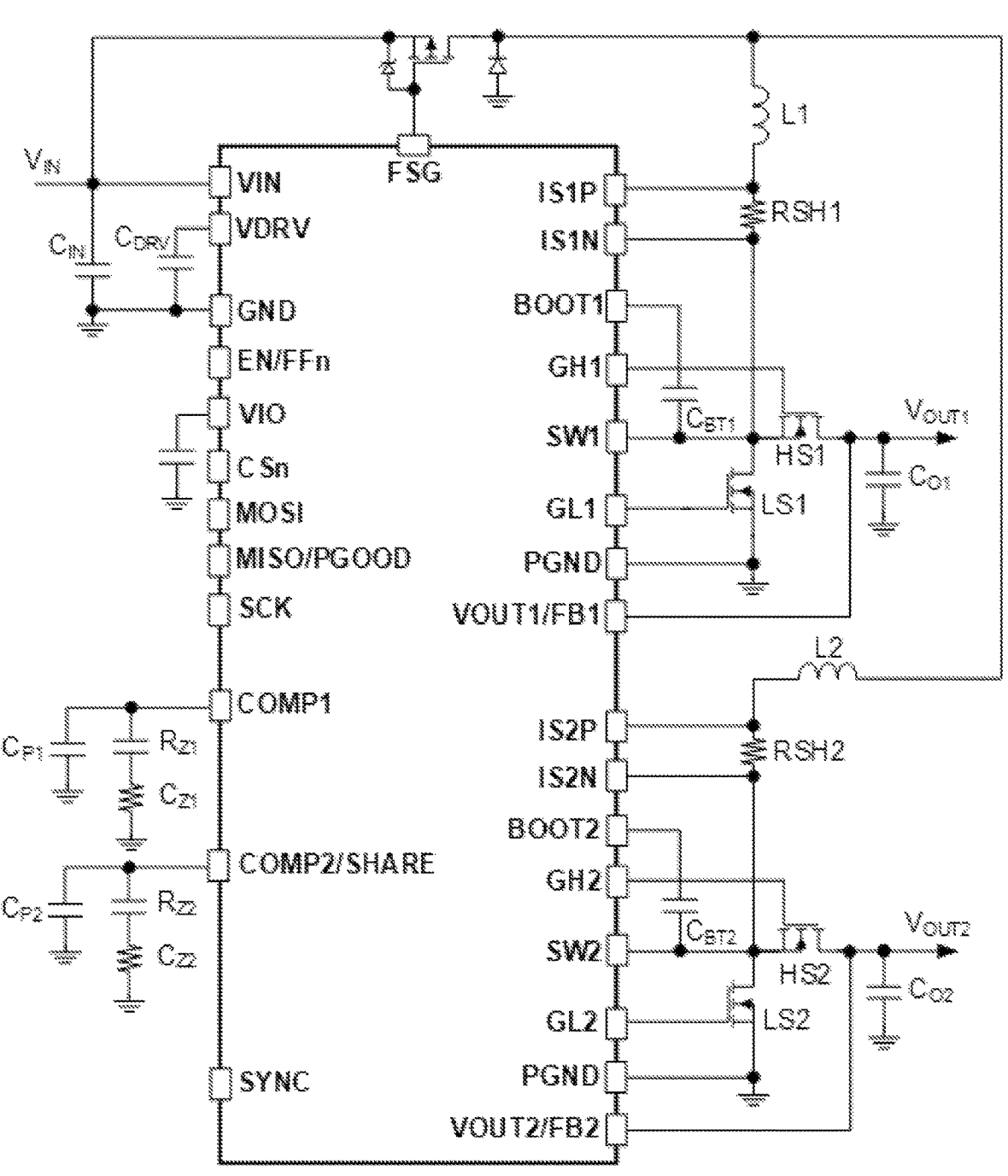
FIG. 11 illustrates a pulse-width modulator based signal generator chip pin out for a DC/DC regulator drive circuit in dual-phase boost mode.
Figure 12:
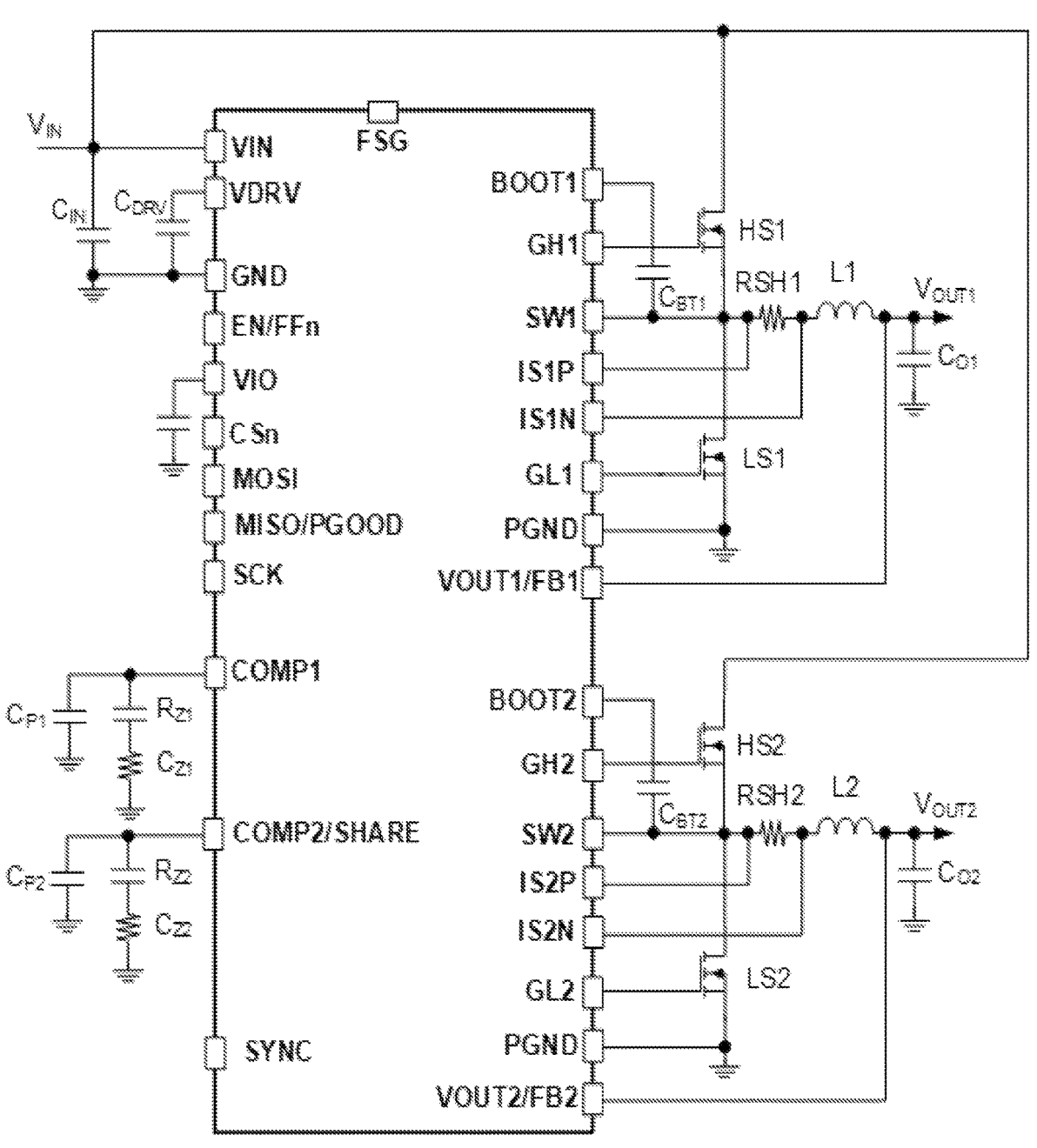
FIG. 12 illustrates a pulse-width modulator based signal generator chip pin out for a DC/DC regulator drive circuit in dual-phase buck mode.
Figure 13:
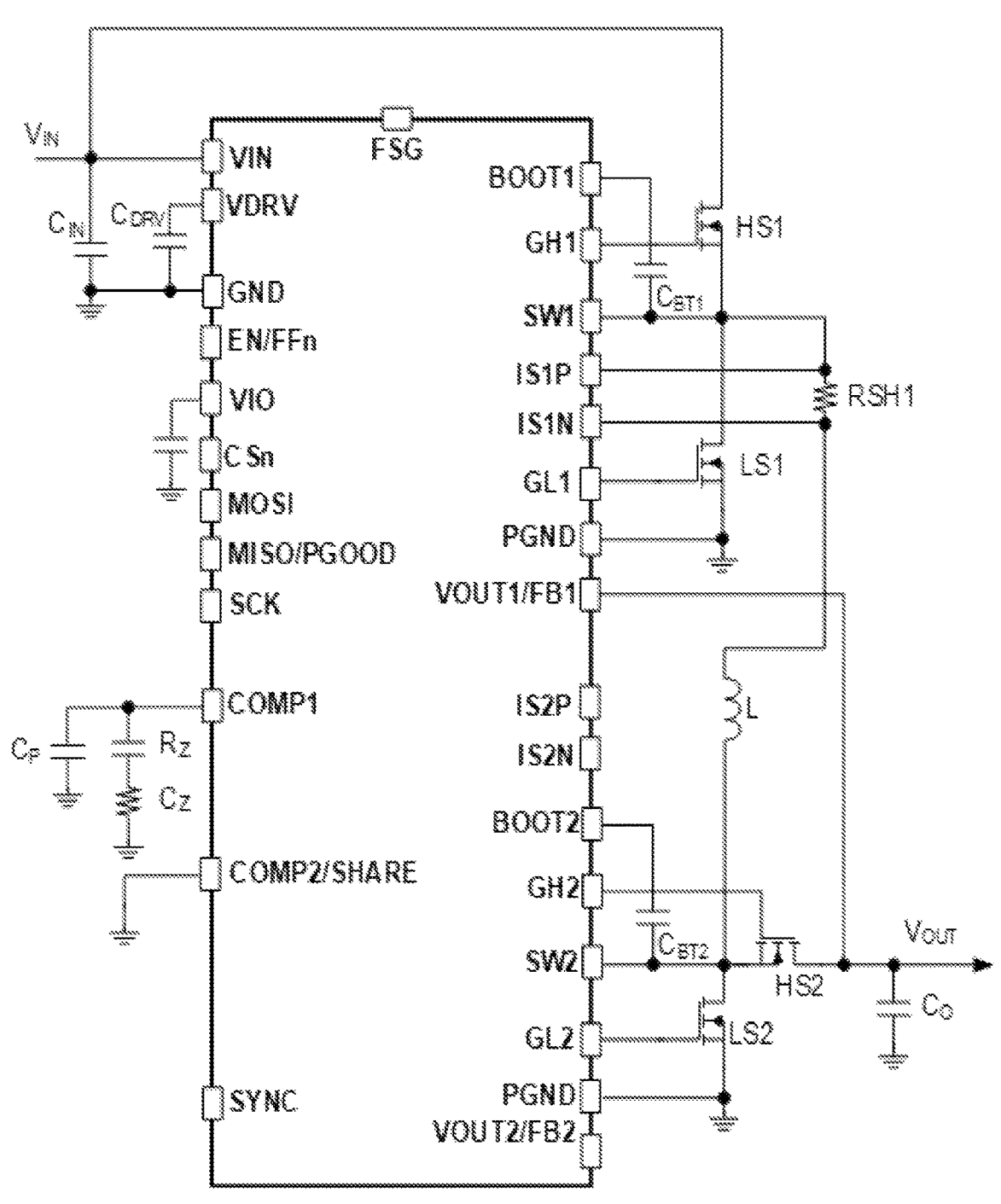
FIG. 13 illustrates a pulse-width modulator based signal generator chip pin out for a DC/DC regulator drive circuit in buck-boost mode.

FIG. 11 illustrates a pulse-width modulator based signal generator chip pin out for a DC/DC regulator drive circuit in dual-phase boost mode. FIG. 12 illustrates a pulse-width modulator based signal generator chip pin out for a DC/DC regulator drive circuit in dual-phase buck mode. FIG. 13 illustrates a pulse-width modulator based signal generator chip pin out for a DC/DC regulator drive circuit in buck-boost mode.

As illustrated in FIGS. 11, 12, and 13, an example pinout configuration is as follows:

CSn Pin—this pin is used as chip select input of the serial interface;

SCK Pin—this pin is used as input for the clock signal of the serial interface;

MISO/PGOOD Pin, MISO Functionality—this pin is used, in SPI Mode, for the serial interface data output;

MISO/PGOOD Pin, PGOOD Functionality—this pin is used, in Stand Alone Mode, to report fault detection and to coordinate the shutdown in array mode after a fault event;

MOSI Pin—this pin is used for the serial interface data input;

SYNC Pin—the Sync pin is used in array mode operation to have the synchronization of the two devices in use;

VIO Pin—this pin is used to supply SPI interface;

COMP1 Pin—this pin is connected to an R-C network used to stabilize the converter;

COMP1 Pin as follower—the COMP1 pin is connected to ground if the related IC is used as a slave in the array mode operation;

ISxP Pin—this pin is used as kelvin connection for the current sense shunt-positive polarity;

ISxN Pin—this pin is used as kelvin connection for the current sense shunt-negative polarity;

SHARE/COMP2 Pin, Share Mode—the share pin of two devices is tied together to communicate the voltage related to the error amplifier of the master device to the slave one when used is array mode;

SHARE/COMP2 Pin, Comp mode—this pin is used as compensation pin when it is not used in array mode connecting COMP2 pin to the compensation rail of the second channel;

VIN Pin—this pin is the primary power supply input of the device;

EN/FFn Pin, EN Mode—this pin is connected to the enable monitor, a voltage at least greater than the ENHI is applied on EN pin to allow the device to power up;

EN/FFn Pin, FFn Mode—this pin is used, in SPI mode, to communicate a fault in the device;

SWx Pin—this pin is connected to the switching node of the DCDC regulator, the external inductance and load is connected as close as possible to reduce parasitic effects and reduce EMI;

BOOTx Pin—this pin is used as a supply for the high side driver;

Pin External Connections—an external capacitance is connected from BOOTx pin to SWx pin;

GHx Pin—this pin is used to drive the gate of the high side external FET;

GLx Pin—this pin is used to drive the gate of the low side external FET;

VDRV Pin—this pin is used as a supply for the drivers and externally there is connected the external decoupling capacitance;

VOUT2/FB2 Pin, VOUT2 Functionality—this pin is used, in SPI mode, as voltage feedback of the DCDC regulator, this feedback path is used as input of the error amplifier;

VOUT2/FB2 Pin, FB2 Functionality—this pin is used, in Stand Alone Mode, to connect the external output voltage resistor divider' this feedback path is used as input of the error amplifier;

VOUT1/FB1 Pin, VOUT1 Functionality—this pin is used, in SPI mode, as voltage feedback of the DCDC regulator, this feedback path is used as input of the error amplifier;

VOUT1/FB1 Pin, FB1 Functionality—this pin is used, in Stand Alone Mode, to connect the external output voltage resistor divider, this feedback path is used as input of the error amplifier; and FSG Pin—this pin is used to drive the gate of the external FET used for the fail-safe driver function.

Figure 14:
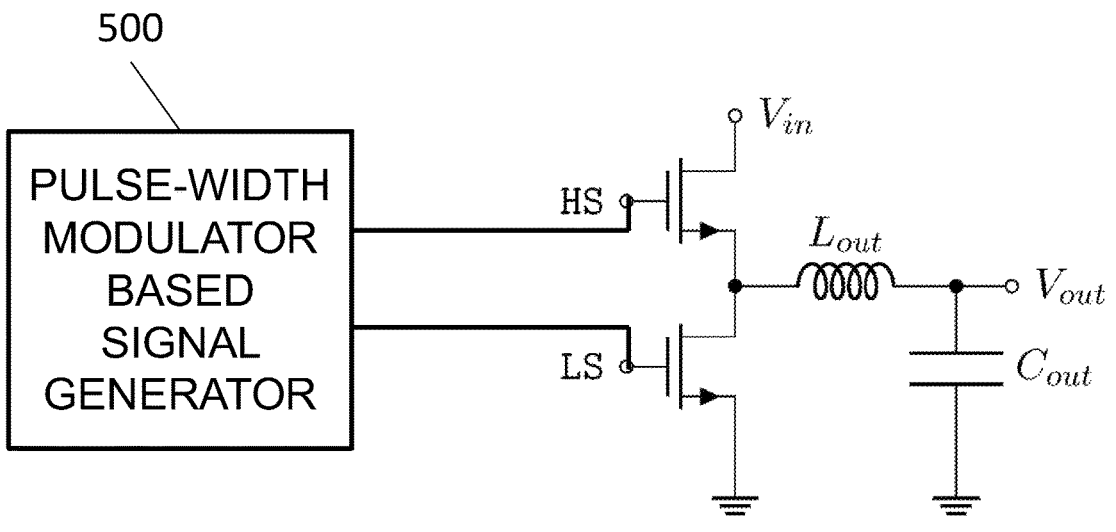
FIG. 14 illustrates a block diagram of a half-bridge configured for buck mode driven by a pulse-width modulator based signal generators.
Figure 15:
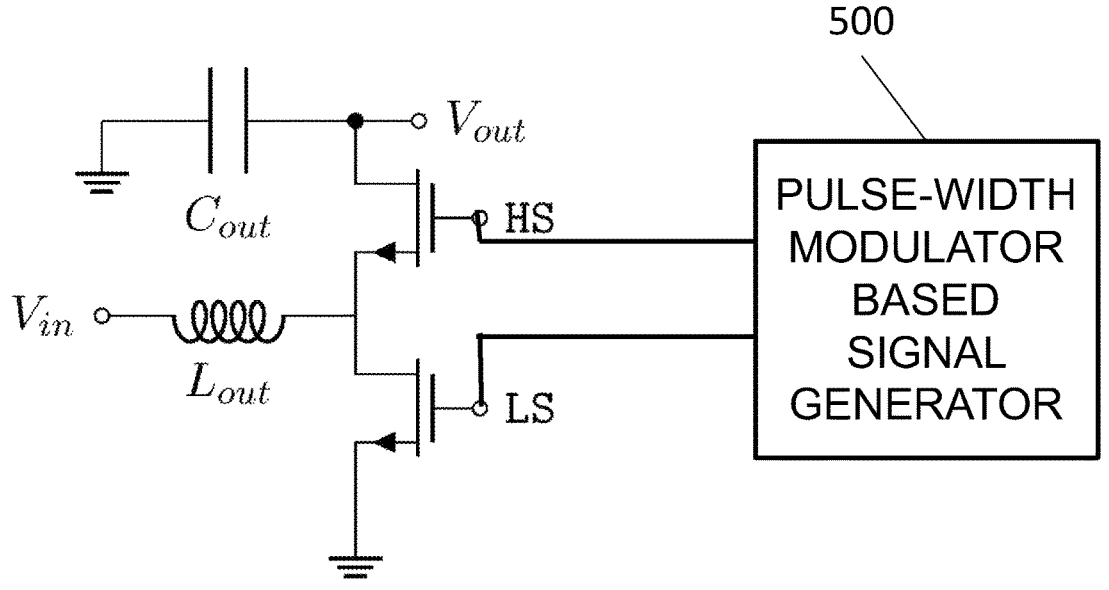
FIG. 15 illustrates a block diagram of a half-bridge configured for boost mode driven by a pulse-width modulator based signal generator.
Figure 16:
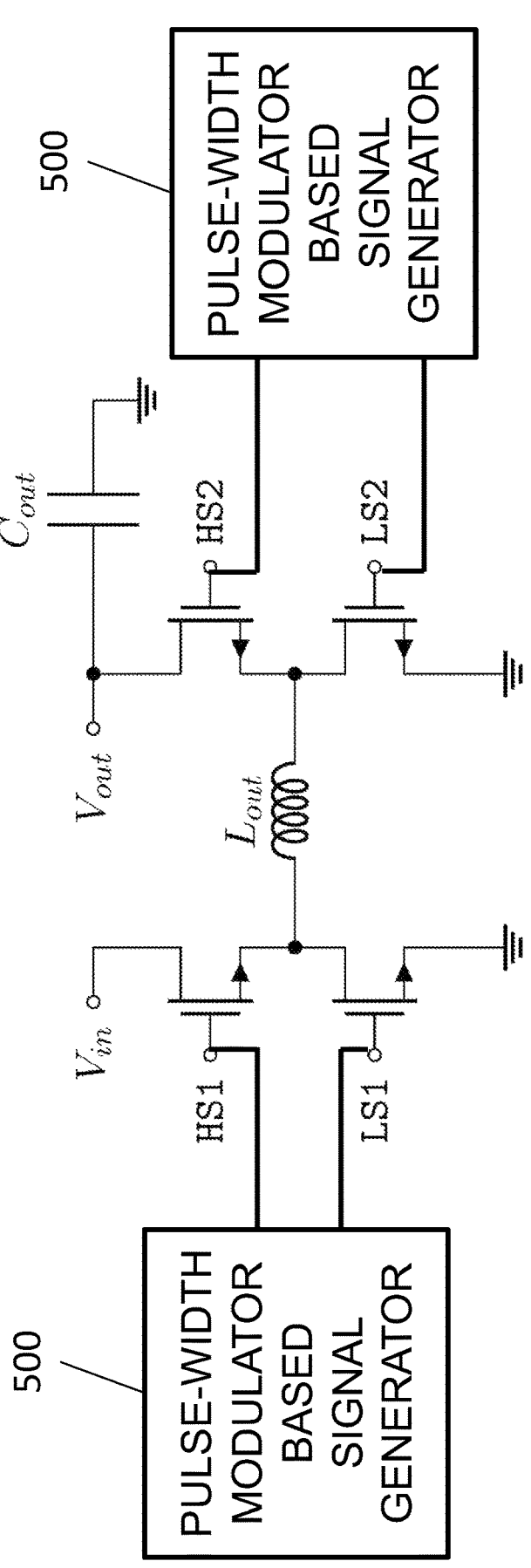
FIG. 16 illustrates a block diagram of two half-bridges configured for buck-boost mode driven by two identical pulse-width modulator based signal generators.

FIGS. 14, 15, and 16 show how a single pulse-width modulator based signal generator IC package 500 can provide buck, boost, and buck-boost operation.

FIG. 14 illustrates a block diagram of a half-bridge configured for buck mode driven by pulse-width modulator based signal generator IC package 500. As illustrated in FIG. 14, a pulse-width modulator based signal generator 500 is operatively connected to a half-bridge configured for buck mod A first output of the pulse-width modulator based signal generator 500 is connected to the gate of the high switch HS of half-bridge configured for buck mode, and a second output of the pulse-width modulator based signal generator 500 is connected to the gate of the high switch LS of half-bridge configured for buck mode. The half-bridge is driven by the pulse-width modulator based signal generator 500, as described above.

FIG. 15 illustrates a block diagram of a half-bridge configured for boost mode driven by the pulse-width modulator based signal generator IC package 500. As illustrated, the pulse-width modulator based signal generator IC package 500 is operatively connected to a half-bridge configured for boost mode. A first output of the pulse-width modulator based signal generator 500 is connected to the gate of the high switch HS of half-bridge configured for boost mode, and a second output of the pulse-width modulator based signal generator 500 is connected to the gate of the high switch LS of half-bridge configured for boost mode. The half-bridge is driven by the pulse-width modulator based signal generator 500, as described above.

FIG. 16 illustrates a block diagram of two half-bridges configured for buck-boost mode driven by two pulse-width modulator based signal generator IC packages 500. In other embodiments, a single IC package includes signal generator circuitry to provide the buck and boost driver signals.

As illustrated in FIG. 16, two identical pulse-width modulator based signal generators 500 are operatively connected to a half-bridge configured for buck mode and a half-bridge configured for boost mode. A first output of a first pulse-width modulator based signal generator 500 is connected to the gate of the high switch HS of half-bridge configured for buck mode, and a second output of the first pulse-width modulator based signal generator 500 is connected to the gate of the high switch LS of half-bridge configured for buck mode. The half-bridge is driven by the first pulse-width modulator based signal generator 500, as described above.

Additionally, a first output of a second pulse-width modulator based signal generator 500 is connected to the gate of the high switch HS of half-bridge configured for boost mode, and a second output of the second pulse-width modulator based signal generator 500 is connected to the gate of the high switch LS of half-bridge configured for boost mode. The half-bridge is driven by the second pulse-width modulator based signal generator 500, as described above.

While example embodiments are shown in conjunction with switches being external to a pulse-width modulator based signal generator IC package, it is understood that in other embodiments pairs of high-side and/or low-side switches can be located internal to the IC package.

It will be appreciated that variations of the above-disclosed embodiments and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the description above and the following claims.

What is claimed is:

1. A device, comprising:
a signal generator configured to generate signals to control first and second switches coupled in a first half-bridge DC-DC converter configuration, the first and second switches being configured in a buck mode of operation or in a boost mode of operation,
wherein said signal generator includes an asynchronous state machine having an asynchronous state machine positive output node and an asynchronous state machine negative output node,
wherein said asynchronous state machine is configured for a first state, a second state, and a third state; and
wherein said asynchronous state machine is configured to allow only a first transition from said first state to said second state, a second transition from said second state to said first state; a third transition from said second state to said third state, and a fourth transition from said third state to said first state.

2. The device according to claim 1, wherein the first and second switches are configured in the buck mode configuration, and wherein said signal generator is configured to generate signals to control third and fourth switches coupled in a second half bridge DC-DC converter configuration, the third and fourth switches being configured in a boost mode of operation.

3. The device according to claim 2, wherein the first and second half bridges are coupled by an inductor.

4. The device according to claim 1, wherein the first and second switches are configured in the buck configuration, and wherein the signal generator is configured to generate signals to control third and fourth switches coupled in a second half bridge DC-DC converter configuration, the third and fourth switches being configured in a buck mode of operation.

5. The device according to claim 1, wherein the first and second switches are configured in the boost configuration, and wherein the signal generator is configured to generate signals to control third and fourth switches coupled in a second half bridge DC-DC converter configuration, the third and fourth switches being configured in a boost mode of operation.

6. The device according to claim 1, wherein said asynchronous state machine, when said asynchronous state machine is in said first state, produces a first value at said asynchronous state machine positive output node and a second value at said asynchronous state machine negative output node, said first value not being equal to said second value.

7. The device according to claim 6, wherein said asynchronous state machine, when said asynchronous state machine is in said second state, produces said second value at said asynchronous state machine positive output node and said first value at said asynchronous state machine negative output node, said first value not being equal to said second value.

8. The device according to claim 7, wherein said asynchronous state machine, when said asynchronous state machine is in said third state, produces said second value at said asynchronous state machine positive output node and said second value at said asynchronous state machine negative output node.

9. The device according to claim 1, wherein said asynchronous state machine has an asynchronous state machine set input node, an asynchronous state machine reset input node, and an asynchronous state machine high impedance input node.

10. The device according to claim 9, wherein said asynchronous state machine transitions to the first state when said asynchronous state machine set input node receives a first value;

wherein said asynchronous state machine transitions to the second state when said asynchronous state machine reset input node receives the first value; and wherein said asynchronous state machine transitions to the third state when said asynchronous state machine high impedance input node receives the first value.

11. The device according to claim 1, wherein said signal generator includes a first multiplexer, operatively connected to said asynchronous state machine, having a first multiplexer output node configured to drive the first switch, and a second multiplexer, operatively connected to said asynchronous state machine, having a second multiplexer output node configured to drive the second switch.

12. The device according to claim 11, wherein said first multiplexer has a first multiplexer low input node and a first multiplexer high input node;

wherein said second multiplexer has a second multiplexer low input node and a second multiplexer high input node;

wherein said asynchronous state machine positive output node is operatively connected to said first multiplexer low input node and said second multiplexer high input node; and wherein said asynchronous state machine negative output node is operatively connected to said first multiplexer high input node and said second multiplexer low input node.

13. The device according to claim 12, wherein said first multiplexer has a first multiplexer selection input node configured to receive a buck/boost signal; and wherein said second multiplexer has a second multiplexer selection input node configured to receive the buck/boost signal.

14. The device according to claim 13, wherein said first multiplexer passes a signal on said first multiplexer low input node to said first multiplexer output node, when the buck/boost signal is a first value, to drive the first switch; and wherein said second multiplexer passes a signal on said second first multiplexer low input node to said second multiplexer output node, when the buck/boost signal is the first value, to drive the second switch.

15. The device according to claim 14, wherein said first multiplexer passes a signal on said first multiplexer high input node to said first multiplexer output node, when the buck/boost signal is a second value, to drive the first switch; and wherein said second multiplexer passes a signal on said second multiplexer high input node to said second multiplexer output node, when the buck/boost signal is the second value, to drive the second switch.

16. The device according to claim 1, wherein said asynchronous state machine toggles between the first state and second state during a continuous conduction mode.

17. The device according to claim 1, wherein said asynchronous state machine transitions to the third state before returning to the first state during a discontinuous conduction mode.

18. The device according to claim 1, wherein the device is an integrated circuit package.

19. A device, comprising:

a signal generator configured to generate signals to control first and second switches coupled in a first half-bridge DC-DC converter configuration, the first and second switches being configured in a buck mode of operation or in a boost mode of operation, wherein the first and second switches are configured in the buck mode configuration, and wherein said signal generator is configured to generate signals to control third and fourth switches coupled in a second half bridge DC-DC converter configuration, the third and fourth switches being configured in a boost mode of operation, wherein said signal generator includes a first asynchronous state machine operatively connected to the first switch and the second switch and a second asynchronous state machine operatively connected to the third switch and the fourth switch, wherein said first asynchronous state machine has a first asynchronous state machine positive output node and a first asynchronous state machine negative output node;

wherein said second asynchronous state machine has a second asynchronous state machine positive output node and a second asynchronous state machine negative output node;

wherein said first asynchronous state machine is configured for a first state, a second state, and a third state;

wherein said second asynchronous state machine is configured for a first state, a second state, and a third state;

wherein said first asynchronous state machine is configured to allow only a first transition from said first state to said second state, a second transition from said second state to said first state; a third transition from said second state to said third state, and a fourth transition from said third state to said first state; and wherein said second asynchronous state machine is configured to allow only a first transition from said first state to said second state, a second transition from said second state to said first state; a third transition from said second state to said third state, and a fourth transition from said third state to said first state, wherein said first asynchronous state machine has a first asynchronous state machine set input node, a first asynchronous state machine reset input node, and a first asynchronous state machine high impedance input node and said second asynchronous state machine has a second asynchronous state machine set input node, a second asynchronous state machine reset input node, and a second asynchronous state machine high impedance input node.

20. The device according to claim 19, wherein said first asynchronous state machine, when said first asynchronous state machine is in said first state, produces a first value at said first asynchronous state machine positive output node and a second value at said first asynchronous state machine negative output node, said first value not being equal to said second value; and wherein said second asynchronous state machine, when said second asynchronous state machine is in said first state, produces a first value at said second asynchronous state machine positive output node and a second value at said second asynchronous state machine negative output node.

21. The device according to claim 20, wherein said first asynchronous state machine, when said first asynchronous state machine is in said second state, produces said second value at said first asynchronous state machine positive output node and said first value at said first asynchronous state machine negative output node; and wherein said second asynchronous state machine, when said second asynchronous state machine is in said second state, produces said second value at said second asynchronous state machine positive output node and said first value at said second asynchronous state machine negative output node.

22. The device according to claim 21, wherein said first asynchronous state machine, when said first asynchronous state machine is in said third state, produces said second value at said first asynchronous state machine positive output node and said second value at said first asynchronous state machine negative output node; and said second asynchronous state machine, when said second asynchronous state machine is in said third state, produces said second value at said second asynchronous state machine positive output node and said second value at said second asynchronous state machine negative output node.

23. The device according to claim 19, wherein said first asynchronous state machine transitions to the first state when said first asynchronous state machine set input node receives a first value;

wherein said first asynchronous state machine transitions to the second state when said first asynchronous state machine reset input node receives the first value;

wherein said first asynchronous state machine transitioning to the third state when said first asynchronous state machine high impedance input node receives the first value;

wherein said second asynchronous state machine transitions to the first state when said second asynchronous state machine set input node receives a first value;

wherein said second asynchronous state machine transitions to the second state when said second asynchronous state machine reset input node receives the first value; and wherein said second asynchronous state machine transitioning to the third state when said second asynchronous state machine high impedance input node receives the first value.

24. The device according to claim 19, wherein said signal generator includes:

a first multiplexer, operatively connected to said first asynchronous state machine, having a first multiplexer output node configured to drive the first switch;

a second multiplexer, operatively connected to said first asynchronous state machine, having a second multiplexer output node configured to drive the second switch;

a third multiplexer, operatively connected to said second asynchronous state machine, having a first multiplexer output node configured to drive the third switch;

a fourth multiplexer, operatively connected to said second asynchronous state machine, having a second multiplexer output node configured to drive the fourth switch.

25. The device according to claim 24, wherein said first multiplexer has a first multiplexer low input node and a first multiplexer high input node;

wherein said second multiplexer has a second multiplexer low input node and a second multiplexer high input node;

wherein said third multiplexer has a third multiplexer low input node and a third multiplexer high input node;

wherein said fourth multiplexer has a fourth multiplexer low input node and a fourth multiplexer high input node;

wherein said first asynchronous state machine positive output node is operatively connected to said first multiplexer low input node and said second multiplexer high input node;

wherein said second asynchronous state machine positive output node is operatively connected to said third multiplexer low input node and said fourth multiplexer high input node;

wherein said first asynchronous state machine negative output node is operatively connected to said first multiplexer high input node and said second multiplexer low input node; and wherein said second asynchronous state machine negative output node is operatively connected to said third multiplexer high input node and said fourth multiplexer low input node.

26. The device according to claim 25, wherein said first multiplexer has a first multiplexer selection input node configured to receive a buck/boost signal;

wherein said second multiplexer has a second multiplexer selection input node configured to receive the buck/boost signal;

wherein said third multiplexer has a third multiplexer selection input node configured to receive the buck/boost signal; and wherein said fourth multiplexer has a fourth multiplexer selection input node configured to receive the buck/boost signal.

27. The device according to claim 26, wherein said first multiplexer passes a signal on said first multiplexer low input node to said first multiplexer output node, when the buck/boost signal is a first value, to drive the first switch;

wherein said second multiplexer passes a signal on said second first multiplexer low input node to said second multiplexer output node, when the buck/boost signal is the first value, to drive the second switch;

wherein said third multiplexer passes a signal on said third multiplexer low input node to said third multiplexer output node, when the buck/boost signal is the first value, to drive the third switch; and wherein said fourth multiplexer passes a signal on said fourth first multiplexer low input node to said fourth multiplexer output node, when the buck/boost signal is the first value, to drive the fourth switch.

28. The device according to claim 27, wherein said first multiplexer passes a signal on said first multiplexer high input node to said first multiplexer output node, when the buck/boost signal is a second value, to drive the first switch;

wherein said second multiplexer passes a signal on said second multiplexer high input node to said second multiplexer output node, when the buck/boost signal is the second value, to drive the second switch;

said third multiplexer passes a signal on said third multiplexer high input node to said third multiplexer output node, when the buck/boost signal is a second value, to drive the third switch; and wherein said fourth multiplexer passes a signal on said fourth multiplexer high input node to said fourth multiplexer output node, when the buck/boost signal is the second value, to drive the fourth switch.

29. The device according to claim 19, wherein said first asynchronous state machine toggles between the first state and second state during a continuous conduction mode and said second asynchronous state machine toggles between the first state and second state during a continuous conduction mode.

30. The device according to claim 19, wherein said first asynchronous state machine transitions to the third state before returning to the first state during a discontinuous conduction mode and said second asynchronous state machine transitions to the third state before returning to the first state during a discontinuous conduction mode.

31. A method comprising:

(a) employing, using a first signal generator on an integrated circuit package, to generate, at a first time, a first set of buck signals to drive first and second switches coupled in a first half-bridge of a two half-bridge DC-DC converter configuration in a buck mode of operation;

(b) employing, using the first signal generator on the integrated circuit package, to generate, at a second time, a first set of boost signals to drive the first and second switches coupled in the first half-bridge of the two half-bridge DC-DC converter configuration in a boost mode of operation;

(c) employing, using a second signal generator on the integrated circuit package, to generate, at a third time, a second set of buck signals to drive third and fourth switches coupled in a second half-bridge of the two half-bridge DC-DC converter configuration in a buck mode of operation; and (d) employing, using the second signal generator on the integrated circuit package, to generate, at a fourth time, a second set of boost signals to drive the third and fourth switches coupled in the second half-bridge of the two half-bridge DC-DC converter configuration in a boost mode of operation, wherein the first signal generator includes an asynchronous state machine configured for a first state, a second state, and a third state and the asynchronous state machine is configured to allow only a first transition from the first state to the second state, a second transition from the second state to the first state, a third transition from the second state to the third state, and a fourth transition from the third state to the first state.

32. The method according to claim 31, further comprising:

(e) employing, using the first signal generator on the integrated circuit package, to generate, at a fifth time, the first set of buck signals to drive the first and second switches coupled in a first half-bridge of a two half-bridge DC-DC converter configuration in a buck mode of operation, and (f) employing, using the second signal generator on the integrated circuit package, to generate, at the fifth time, the second set of boost signals to drive the third and fourth switches coupled in the second half-bridge of the two half-bridge DC-DC converter configuration in a boost mode of operation.

33. The method according to claim 32, wherein the first signal generator includes a first asynchronous state machine configured for a first state, a second state, and a third state; the first asynchronous state machine is configured to allow only a transition from the first state to the second state, a transition from the second state to the first state, a transition from the second state to the third state, and a transition from the third state to the first state; the second signal generator includes a second asynchronous state machine configured for the first state, the second state, and the third state; and the second asynchronous state machine is configured to allow only a transition from the first state to the second state, a transition from the second state to the first state; a transition from the second state to the third state, and a transition from the third state to the first state.

34. The method according to claim 33, wherein the first and second switches and the third and fourth switches coupled by an inductor.

35. The method according to claim 34, wherein the transition from the second state to the third state occurs when electric current in the inductor is decreasing from a positive value towards zero.

36. The method according to claim 34, wherein the transition from the third state to the first state occurs when electric current in the inductor is increasing from zero towards a positive value.

37. The method according to claim 31, further comprising:

(e) employing, using the first signal generator on the integrated circuit package, to generate, at a fifth time, the first set of boost signals to drive first and second switches coupled in a half-bridge configuration in a boost mode of operation, and (f) employing, using the second signal generator on the integrated circuit package, to generate, at the fifth time, the second set of buck signals to drive the third and fourth switches coupled in the half-bridge configuration in a buck mode of operation.

38. The method according to claim 32, wherein the asynchronous state machine toggles between the first state and second state during a continuous conduction mode.

39. The method according to claim 32, wherein the asynchronous state machine transitions to the third state before returning to the first state during a discontinuous conduction mode.

40. A method comprising:

(a) employing a first signal generator and a second signal generator to drive a two half-bridge DC-DC converter configuration, during a first time, in a buck mode of operation, by (a1) generating, using a first signal generator on an integrated circuit package, a first set of buck signals to drive first and second switches coupled in a first half-bridge of the two half-bridge DC-DC converter configuration, or (a2) generating, using a second signal generator on the integrated circuit package, a second set of buck signals to drive third and fourth switches coupled in a second half-bridge of the two half-bridge DC-DC converter configuration;

(b) employing the first signal generator and the second signal generator to drive the two half-bridge DC-DC converter configuration, during a second time, when in a boost mode of operation, by (b1) generating, using the first signal generator on the integrated circuit package, a first set of boost signals to drive first and second switches coupled in the first half-bridge of the two half-bridge DC-DC converter configuration, or (b2) generating, using the second signal generator on the integrated circuit package, a second set of boost signals to drive third and fourth switches coupled in the second half-bridge of the two half-bridge DC-DC converter configuration; and (c) employing the first signal generator and the second signal generator to drive the two half-bridge DC-DC converter configuration, during a third time, when in a buck-boost mode of operation, by (c1) generating, using the first signal generator on the integrated circuit package, the first set of buck signals to drive first and second switches coupled in the first half-bridge of the two half-bridge DC-DC converter configuration, and (c2) generating, using the second signal generator on the integrated circuit package, the second set of boost signals to drive the third and fourth switches coupled in the second half-bridge of the two half-bridge DC-DC converter configuration, wherein the first signal generator includes a first asynchronous state machine configured for a first state, a second state, and a third state; the first asynchronous state machine is configured to allow only a transition from the first state to the second state, a transition from the second state to the first state, a transition from the second state to the third state, and a transition from the third state to the first state; the second signal generator includes a second asynchronous state machine configured for the first state, the second state, and the third state; and the second asynchronous state machine is configured to allow only a transition from the first state to the second state, a transition from the second state to the first state; a transition from the second state to the third state, and a transition from the third state to the first state.

41. The method according to claim 40, further comprising:

(d) employing the first signal generator and the second signal generator to drive the two half-bridge DC-DC converter configuration, during a fourth time, when in a buck-boost mode of operation, by (d1) generating, using the first signal generator on the integrated circuit package, the first set of boost signals to drive first and second switches coupled in the first half-bridge of the two half-bridge DC-DC converter configuration and (d2) generating, using the second signal generator on the integrated circuit package, the second set of buck signals to drive the second set of signals to drive third and fourth switches coupled in the second half-bridge of the two half-bridge DC-DC converter configuration.

42. The method according to claim 40, further comprising:

(d) employing the first signal generator and the second signal generator to drive the two half-bridge DC-DC converter configuration, during a fourth time, when in a dual buck mode of operation, by (d1) generating, using a first signal generator on the integrated circuit package, a first set of buck signals to drive first and second switches coupled in a first half-bridge of the two half-bridge DC-DC converter configuration, and (d2) generating, using a second signal generator on the integrated circuit package, a second set of buck signals to drive third and fourth switches coupled in a second half-bridge of the two half-bridge DC-DC converter configuration; and (e) employing the first signal generator and the second signal generator to drive the two half-bridge DC-DC converter configuration, during a fourth time, when in a dual boost mode of operation, by (e1) generating, using the first signal generator on the integrated circuit package, a first set of boost signals to drive first and second switches coupled in the first half-bridge DC-DC converter configuration, and (e2) generating, using the second signal generator on the integrated circuit package, a second set of boost signals to drive third and fourth switches coupled in the second half-bridge of the two half-bridge DC-DC converter configuration.

43. The method according to claim 42, wherein the transition from the second state to the third state occurs when electric current in an inductor in the two half-bridge DC-DC converter configuration is decreasing from a positive value towards zero.

44. The method according to claim 40, wherein the transition from the third state to the first state occurs when electric current in an inductor in the two half-bridge DC-DC converter configuration is increasing from zero towards a positive value.

* * * * *